United States Patent [19]

Iseman

[11] Patent Number: 4,794,756

[45] Date of Patent: Jan. 3, 1989

[54] HYDRAULIC DIFFERENTIAL

[75] Inventor: Walter J. Iseman, Monroe Center, Ill.

[73] Assignee: Sundstrand Corporation, Rockford, Ill.

[21] Appl. No.: 134,752

[22] Filed: Dec. 18, 1987

[51] Int. Cl.$^4$ ............................................. F16D 39/00
[52] U.S. Cl. ...................................... 60/489; 60/487; 91/485
[58] Field of Search ................. 91/485, 486, 499, 505, 91/506; 60/489, 487, 490, 491, 492, 488

[56] References Cited

U.S. PATENT DOCUMENTS

| | | | |
|---|---|---|---|
| 2,633,710 | 4/1953 | Jarmann | 60/487 |
| 2,687,049 | 8/1954 | Ebert | 60/487 X |
| 3,092,036 | 6/1963 | Creighton | 91/485 |
| 3,131,539 | 5/1964 | Creighton et al. | 60/53 |
| 3,680,652 | 8/1972 | Greene | 180/22 |
| 3,799,033 | 3/1974 | Pruvot | 91/485 X |
| 4,046,029 | 9/1977 | Sugden | 74/687 |
| 4,252,035 | 2/1981 | Cordner et al. | 74/687 |
| 4,581,896 | 4/1986 | Andresen et al. | 60/489 |
| 4,616,478 | 10/1986 | Jensen | 60/487 |

Primary Examiner—Edward K. Look
Attorney, Agent, or Firm—Wood, Dalton, Phillips, Mason & Rowe

[57] ABSTRACT

A hydraulic differential having a pair of axial piston displacement units, with one being a fixed displacement unit, and the other being a variable displacement unit, and having flow-directing valve and port plates positioned therebetween. The hydraulic sealing of the components which rotate relative to each other is achieved by a floating mounting of a port plate which is urged by a block spring of the fixed displacement unit against an adjustable valve plate abutting a cylinder block of the variable displacement unit. The drive input for the hydraulic differential includes a rotatable mounting for the fixed angle wobbler of the fixed displacement unit which is drivingly connected through a connecting tubular member to the cylinder block of the variable displacement unit and with the cylinder block of the fixed displacement unit connected to a drive output shaft. Relatively small radial bearings rotatably mount the components within a case and are only required to react the spring load of the block spring acting against the floating port plate.

11 Claims, 1 Drawing Sheet

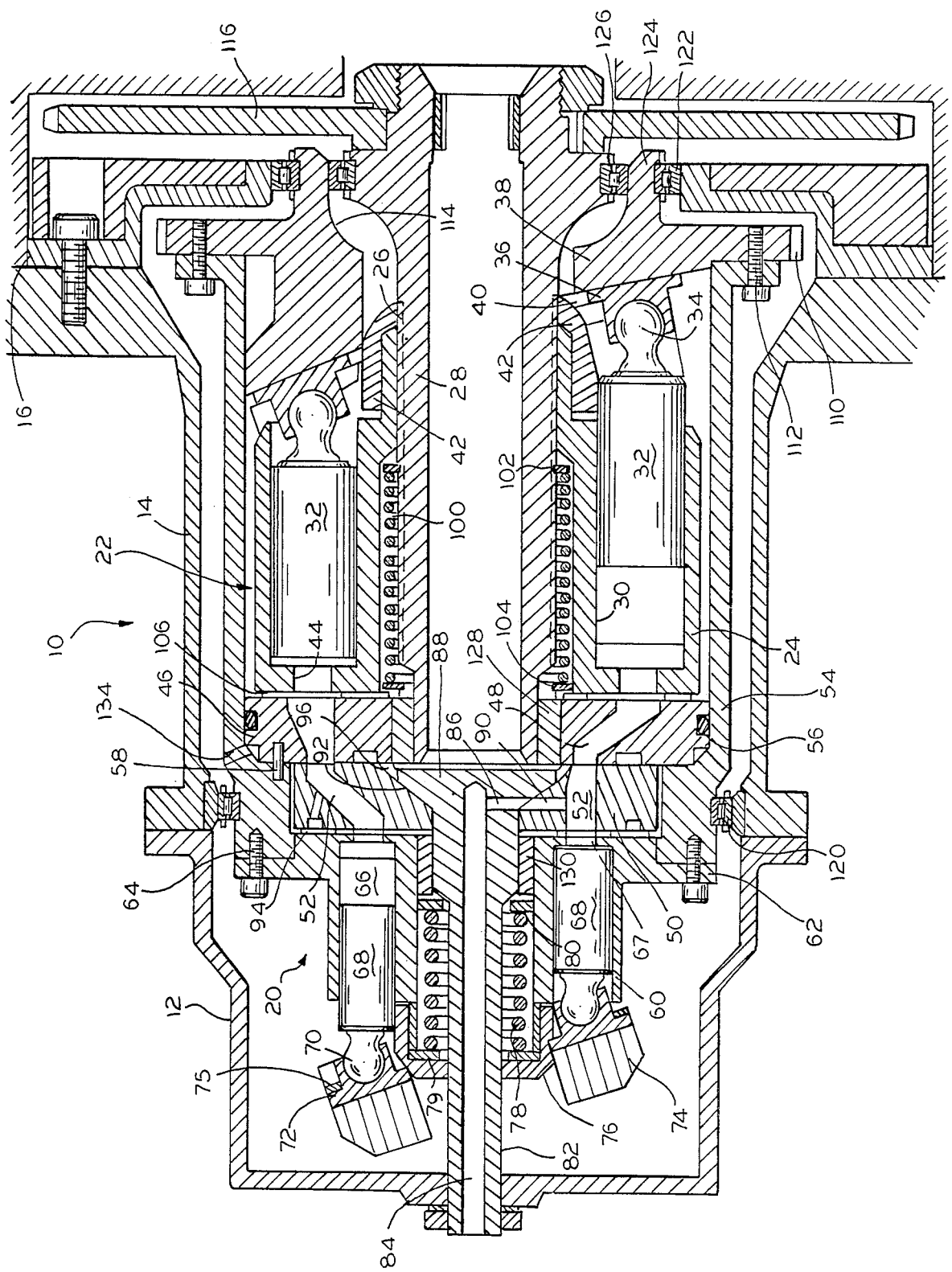

HYDRAULIC DIFFERENTIAL

FIELD OF THE INVENTION

This invention relates to a hydraulic differential having a pair of axial piston displacement units, with one unit having variable displacement and the other unit having fixed displacement and with direction of fluid flow therebetween through a valve plate and a port plate. The port plate and valve plate have floating mountings and the port plate is yieldably urged toward the valve plate, with hydrostatic bearings between the components having relative rotation. The components are constructed and assembled to provide a closed force loop. The bearings for rotative support of the components need only react the yieldable loading on the port plate and, therefore, can be relatively small radial bearings.

BACKGROUND OF THE INVENTION

The hydraulic differential functions to vary the ratio between an input speed and an output speed. One example of such use of a hydraulic differential in a hydraulic transmission is disclosed in the Cordner et al. U.S. Pat. No. 4,252,035, owned by the assignee of this application.

The hydraulic differential has a pair of axial piston displacement units assembled together with a valve plate and a port plate positioned therebetween for directing flow between the two displacement units. One of the displacement units is of fixed displacement, as provided by a fixed angle wobbler associated with the pistons of the unit. The other displacement unit is of variable displacement and has a wobbler associated therewith which may be positioned at a selected angle to provide the desired ratio between the input and output speeds of the hydraulic differential.

Other examples of hydraulic differentials are disclosed in the Creighton et al. U.S. Pat. No. 3,131,539, and another patent owned by the assignee of this application, namely, Sugden U.S. Pat. No. 4,046,029.

The foregoing prior art does not disclose a relatively compact hydraulic differential utilizing floating port and valve plates between a pair of axial piston displacement units with a hydrostatic bearings between relatively movable components with yieldable loading of the port plate, as by a block spring of a displacement unit, and with the structure related to provide a closed force loop whereby relatively small radial bearings can be used for rotatable mounting of the components, with the bearings only required to react the block spring loading.

SUMMARY OF THE INVENTION

A primary feature of the invention is to provide a hydraulic differential having a pair of axial piston displacement units with hydrostatic bearings between relatively movable components and a floating port plate urged against a movable valve plate by yieldable means and with the structure connected together to provide a closed force loop whereby the only external loading is the force of the yieldable means which can be reacted by relatively small radial bearings for the rotative components.

In an illustrative embodiment of the invention, the hydraulic differential has an axial piston displacement unit of variable displacement with an adjustable wobbler and an axial piston displacement unit of fixed displacement with a fixed angle wobbler. A valve plate and port plate are interposed between the cylinder blocks of the two displacement units for directing fluid flow therebetween. The port plate is floatingly mounted and is urged against the valve plate by a block spring associated with the cylinder block of the fixed displacement unit. A drive input to the cylinder block of the variable displacement unit includes a tubular member connected to the fixed angle wobbler which is rotatably mounted, whereby hydraulic thrust forces are contained within a closed force loop and the force of the block spring is reacted against relatively small radial bearings.

The tubular member of the drive input is connected to the cylinder block of the variable displacement unit and provides a rotative mounting therefor which counteracts the centrifugal tipping moment resulting from rotation of the cylinder block whereby the cylinder block may rotate at a faster speed than when the centrifugal tipping movement is merely opposed by a block spring.

An object of the invention is to provide a new and improved hydraulic differential utilizing a spring-loaded, floating port plate and with the structural components related to provide a closed force loop relative to hydraulic thrust forces.

Still another object of the invention is to provide a new and improved hydraulic differential having a pair of axial piston displacement units, with one unit being of fixed displacement having a fixed angle wobbler and a cylinder block and the other unit being of variable displacement having a variable angle wobbler and a cylinder block. Each of the cylinder blocks has a circular array of reciprocal pistons, each provided with a slipper for coacting with the associated wobbler and with there being hydrostatic bearings between the wobblers and slippers and between the valve plate and the adjacent cylinder block of the variable displacement unit and between the port plate and the valve plate. The fixed angle wobbler is rotatably mounted within a case and has a drive input gear associated therewith which is connected through a tubular member to the cylinder block of the variable displacement unit and radial bearings mount the aforesaid structure for rotation whereby a major part of the hydraulic thrust forces are contained within a closed force loop. The port plate is rotatable with the cylinder block of the variable displacement unit and floats relative to the adjacent adjustably-supported valve plate and a block spring associated with the cylinder block of the fixed displacement unit acts on the port plate to maintain loading on the valve plate. The only external loading placed on the radial bearings is the force of the block spring. Although the use of a block spring to react the centrifugal tipping moment of a rotatable cylinder block is known in the art, the hydraulic differential embodying the invention has the block spring performing an additional function in spring-loading the port plate against the valve plate and with a hydrostatic bearing therebetween.

Another object of the invention is to provide a hydraulic differential comprising, a pair of hydraulic axial piston units each having a cylinder block with a circular array of cylinders each having an axially-movable piston with one unit being of fixed displacement and the other of variable displacement and the latter unit having an adjustable angle wobbler for controlling the displacement of the axially-movable pistons associated therewith, drive input means for rotating the cylinder block of the variable displacement unit, drive output means connected to the cylinder block of the fixed displacement unit, a movable valve plate and a port plate interposed between the cylinder blocks for directing fluid flow between the axial piston units, said port plate being connected for rotation with the variable displacement unit cylinder block and floating relative to the cylinder block of the fixed displacement unit and the valve plate being fixed against rotation, and spring means urging the floating port plate against the valve plate.

An additional object of the invention is to provide a hydraulic differential as defined in the preceding paragraph including means mounting said valve plate for swivelling adjustment relative to the face of the cylinder block of the variable displacement unit, said means comprising a shaft extended through the cylinder block and the shaft and valve plate having a partially-spherical swivel joint.

Still another object of the invention is to provide a hydraulic differential as defined in the preceding paragraphs wherein there is a drive input to the fixed angle wobbler and connection thereof by a tubular member to the cylinder block of the variable displacement unit whereby there is a closed force loop for hydraulic thrust forces and the last-mentioned cylinder block has its centrifugal tipping moment taken up by the connections to the tubular member and fixed angle wobbler.

DESCRIPTION OF THE DRAWING

The FIGURE is a central, vertical section through the hydraulic differential.

DESCRIPTION OF THE PREFERRED EMBODIMENT

The hydraulic differential is shown in central vertical section in the Figure wherein a case, indicated generally at 10, has joined-together sections 12, 14, and 16, which houses the components of the hydraulic differential.

The two major components of the hydraulic differential are a pair of axial piston displacement units, indicated generally at 20 and 22, with the displacement unit 20 being of variable displacement and the displacement unit 22 being of fixed displacement.

The fixed displacement unit has a cylinder block 24 splined at 26 to a drive output shaft 28. The cylinder block 24 has a circular array of cylinders 30, each of which reciprocally mount a piston 32. Each of the pistons has a spherical end 34 extending outwardly from the cylinders which is movably mounted in a slipper 36, with the slippers engaged against the surface of a fixed angle wobbler 38 and the slippers are held in position by a retainer ring 40 coacting with a ball piston return member 42, with this construction being conventional and known in the art.

Each of the cylinders 30 has a port 44 at an end thereof communicating with a port plate 46 with flow-directing passages 48. The port plate 46, by a mounting to be described, rotates relative to a valve plate 50 having flow passages 52 which selectively communicate with the passages 48 in the port plate 46. The port plate 46 is fixed to a tubular member 54 to be further described in connection with the drive input for the hydraulic differential, with the periphery of the port plate being sealed thereto by an O-ring 56 and with the two being fixed for rotation together by a series of pins, one of which is shown at 58. The pins permit axial freedom of movement for the port plate.

The variable displacement unit 20 has a cylinder block 60 with a flange 62 secured to an end of the tubular member 54 by threaded members 64. The cylinder block 60 has a circular array of cylinders 66 with ports 67, each mounting a piston 68. The spherical ends 70 of the pistons are each mounted in a slipper 72 coacting with a variable angle wobbler 74. The variable angle wobbler 74 is mounted to the case in a manner known in the art including trunnions (not shown) permitting pivoting of the wobbler to either side of an upright neutral position. One maximum angle position is shown in the Figure and an opposite maximum angle position has the wobbler 74 pivoted clockwise from the position shown in the Figure.

The slippers have a piston return ring 75 associated therewith which coacts with a ball piston return member 76. A block spring 78 coacts between a ring 79 captured by the ball piston return member 76 and an internal flange 80 in a central bore of the cylinder block to yieldably urge the cylinder block 60 against the valve plate 50.

A rod 82, extending through a wall of the case section 12, has a charge pressure supply passage 84 for supplying fluid at charge pressure to the valve plate passages 52 through a passage 86 in a specially-shaped end 88 of the rod and a passage 90 in the valve plate. The specially-shaped end 88 has a partially-spherical surface to coact with a similar-shaped surface 92 formed in the valve plate 50 to provide a swivel joint whereby a disc 94 of bronze or other material carried on a face of the valve plate may engage flush against a face of the cylinder block 60. The rod 82 is fixed to the case against rotation and there is a spline connection 96 between the partially-spherical shaped end 88 and the valve plate to lock the valve plate 50 against rotation.

A block spring 100 associated with the cylinder block 24 of the fixed displacement unit is in the form of a helical compression spring and engages between a ring 102, fixed to the drive output shaft 28, and a ring 104, abutting a disc of bronze or other material at a face of the port plate 46, whereby the port plate is urged against the valve plate 50. The port plate and valve plate are constructed to be both moment and pressure balanced and there are hydrostatic bearings between the cylinder block 60 of the variable displacement unit and the valve plate 50 as well as between the valve plate and port plate. With there also being a hydrostatic bearing between the port plate and the cylinder block 24 of the fixed displacement unit, only the force exerted by the block spring 100 is required to maintain an effective seal between the components. There are also hydrostatic bearings provided between the slippers and wobblers of the displacement units. Thrust exerted against the wobbler 74 of the variable displacement unit is reacted by the trunnions mounting the wobbler. The other hydraulic thrust forces are self-contained within the rotative components of the hydraulic differential, with the structure constructed and assembled to define a closed force loop. As a result, rotative components can be mounted to the case by relatively small radial bearings, since the only force reacted by those bearings is the force exerted by the block spring 100.

The closed force loop will be more fully understood in connection with the description of the drive input and drive output structure.

The drive input comprises an input gear associated with the fixed angle wobbler 38, with this gear being shown as formed integrally on the periphery thereof and having gear teeth 110. Rotation of the fixed angle wobbler 38 results in rotation of the previously-mentioned tubular member 54 which is connected to the fixed angle wobbler by threaded members 112 extended through the flange 62. As previously stated, the tubular member 54 supports the cylinder block 60 of the variable displacement unit and rotation thereof results in reciprocation of the pistons 68 with the stroke determined by the angle of the variable angle wobbler 74. This results in delivery of fluid under pressure through the valve plate and port plate to the cylinders 30 of the cylinder block 24 of the fixed displacement unit which functions as a motor and the rotation thereof causes rotation of the drive output shaft 28 which extends through an opening 114 in the fixed angle wobbler 38 and mounts an output gear 116 outboard of the fixed angle wobbler.

As previously stated, the closed force loop contains hydraulic thrust forces within the rotatable components because of the interconnection of the fixed angle wobbler 38 to the cylinder block 62 of the variable displacement unit through the connecting tubular member 54. Because of this, relatively small radial bearings can be used to rotatably mount the components since it is only required that the radial bearings react the spring load of the block spring 100. The drive input structure is rotatably mounted relative to the case 10 by a pair of radial bearings 120 and 122 positioned between the case and an end of the tubular member 54 and a projecting flange 124 of the fixed angle wobbler 38. The drive output shaft 28 is rotatably mounted adjacent one end thereof by a radial bearing 126 supported by the projecting flange 124 of the fixed angle wobbler 38. A sleeve bearing 128 is positioned between an inboard end of the output drive shaft and the port plate 46. An additional sleeve bearing 130 is positioned between the cylinder block 60 of the variable displacement unit and the rod 82.

A plurality of scavenge openings in the peripheral wall of the tubular member 54, one of which is shown at 134, provide for scavenge of oil to the interior of the case because of centrifugal force resulting from rotation of the components.

The operation of the hydraulic differential is believed clearly evident from the foregoing description. However, the operation may be briefly summarized. With the variable angle wobbler 74 disposed vertically, the input and output rotational speeds of the hydraulic differential would be identical. As the wobbler 74 is moved from a vertical position to the position shown, the drive output speed will increase relative to the input speed and, if the variable angle wobbler 74 is moved in a clockwise direction from vertical, the output speed will decrease to a speed less than the input speed. The angle of the variable angle wobbler 74 controls the ratio of output speed to input speed.

The block spring 100 performs two functions in that it reacts the centrifugal tipping moment of the cylinder block 24 and also exerts a force against the valve plate 46 to effect a seal between the valve plate and port plate and adjacent components. The block spring 100 avoids the requirement for big bearings and a fixed clearance valve plate and, thus, avoids problems in leakage and binding which could occur because of changes in the operating temperature with resulting size changes of the components and minimizes externally-reacted loads. The centrifugal tipping moment of the cylinder block 60 of the variable displacement unit is taken by the tubular member 54 of the drive input means and, therefore, the cylinder block can run at a faster speed than when the centrifugal tipping moment is taken up only by a block spring.

I claim:

1. A hydraulic differential comprising, a pair of hydraulic axial piston units each having a cylinder block with a circular array of cylinders each having an axially-movable piston with one unit being of fixed displacement and the other of variable displacement and the latter unit having an adjustable angle wobbler for controlling the displacement of the axially-movable pistons associated therewith, drive input means for rotating a fixed angle wobbler of the fixed displacement unit and the cylinder block of the variable displacement unit, drive output means connected to the cylinder block of the fixed displacement unit, a valve plate and a port plate interposed between the axial piston units, said port plate being connected for rotation with the variable displacement cylinder block and floating relative to the cylinder block of the fixed displacement unit and the valve plate being fixed against rotation, and spring means acting between the cylinder block of the fixed displacement unit and the floating port plate for urging the floating port plate against the valve plate.

2. A hydraulic differential as defined in claim 1 wherein said valve plate abuts said variable displacement unit cylinder block and means mounting said valve plate for swivelling adjustment against said last-mentioned cylinder block.

3. A hydraulic differential as defined in claim 2 wherein said valve plate mounting means includes a shaft extended through the cylinder block of the variable displacement unit and the shaft and valve plate having a partially-spherical swivel joint.

4. A hydraulic differential as defined in claim 1 including a case housing the components thereof, and said drive input means includes the fixed angle wobbler of the fixed displacement rotatably mounted by the case, and a tubular member connected between the fixed angle wobbler and the cylinder block of the variable displacement unit and enveloping said valve plate, port plate and the cylinder block of the fixed displacement unit to provide a closed force loop and react hydraulic thrusts against the fixed angle wobbler.

5. A hydraulic differential as defined in claim 4 wherein said drive output means includes a rotatable output shaft splined to the cylinder block of the fixed displacement unit and extending through said fixed angle wobbler, and an output gear fixed to said shaft outboard of said fixed angle wobbler.

6. A hydraulic differential as defined in claim 5 wherein a pair of radial bearings supported by the case mount the tubular member and fixed angle wobbler for rotation relative to the case, and a third radial bearing is positioned between the output shaft and the fixed angle wobbler.

7. A hydraulic differential as defined in claim 4 wherein there are scavenge openings through a peripheral wall of the tubular member whereby centrifugal force resulting from rotation of the tubular member scavenges fluid from the interior thereof.

8. A hydraulic differential comprising: a case; an axial piston displacement unit of variable displacement in said case and having a cylinder block with circularly-arranged cylinders each reciprocally mounting a piston and a variable angle wobbler for stroking said pistons; an axial piston displacement unit of fixed displacement in said case having a cylinder block with a circular array of cylinders each reciprocally-mounting a piston and a fixed angle wobbler coacting with the last-mentioned pistons; a pressure and moment balanced valve plate; a pressure and moment balanced port plate; said valve plate and port plate being interposed between said cylinder blocks to direct fluid flow between the cylinders thereof with said port plate and valve plate being movably mounted and the port plate being rotatable with the cylinder block of the variable displacement unit; a block spring for the cylinder block of the fixed displacement unit urging the port plate against the valve plate; a tubular member enveloping the fixed displacement unit and connected between the fixed angle wobbler and the cylinder block of the variable displacement unit to provide a closed force loop, a drive input for the variable displacement unit including said tubular member, and a drive output operatively connected to the cylinder block of the fixed displacement unit.

9. A hydraulic differential as defined in claim 8 including a shaft extended through a central bore in the variable displacement unit cylinder block, and a partially-spherical connection between said shaft and the valve plate.

10. A hydraulic differential as defined in claim 8 including radial bearings rotatably mounting said fixed angle wobbler and the tubular member within the case.

11. A hydraulic differential comprising: a case; a variable displacement unit in said case and having a cylinder block with circularly-arranged cylinders each reciprocally-mounting a piston and a variable angle wobbler for stroking said pistons; a fixed displacement unit in said case having a cylinder block with a circular array of cylinders each reciprocally-mounting a piston and a fixed angle wobbler coacting with the last-mentioned pistons; a valve plate; a port plate; said valve plate and port plate being interposed between said cylinder blocks to direct fluid flow between the cylinders with the port plate floating relative to the valve plate; yieldable means reacting between the fixed displacement unit cylinder block and the port plate to urge the port plate against the valve plate; a tubular member enveloping the fixed displacement unit and connected between the fixed angle wobbler and the cylinder block of the variable displacement unit to provide a closed force loop, a drive input for the variable displacement unit including said tubular member and a rotatable mounting for the fixed angle wobbler, a drive output shaft operatively connected to the cylinder block of the fixed displacement unit and extending through an opening in the fixed angle wobbler; radial bearing means between the drive output shaft and the fixed angle wobbler and between the case and both the tubular member and fixed angle wobbler.

* * * * *